US007871629B1

(12) United States Patent
Gomez-Chiarri et al.

(10) Patent No.: US 7,871,629 B1
(45) **Date of Patent: *Jan. 18, 2011**

(54) DELIVERY OF DNA VACCINES INTO FISH BY IMMERSION

(75) Inventors: Marta Gomez-Chiarri, Jamestown, RI (US); David R. Nelson, Wakefield, RI (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/760,024

(22) Filed: Apr. 14, 2010

Related U.S. Application Data

(63) Continuation of application No. 09/915,615, filed on Jul. 26, 2001, now abandoned.

(60) Provisional application No. 60/220,733, filed on Jul. 26, 2000.

(51) Int. Cl.
*A61K 39/106* (2006.01)

(52) U.S. Cl. .............. 424/261.1; 424/190.1; 424/200.1; 435/243; 435/252.1; 435/252.3; 435/471

(58) Field of Classification Search ....................... None
See application file for complete search history.

(56) References Cited

U.S. PATENT DOCUMENTS 5,780,448 A 7/1998 Davis
5,877,159 A 3/1999 Powell et al.
6,150,170 A 11/2000 Powell et al.
6,913,757 B1 7/2005 Nelson

OTHER PUBLICATIONS

Anderson Ed et al., "Genetic immunization of rainbow trout (Oncorhynchus mykiss) against infectious hematopoietic necrosis virus", Mol. Mar. Biol. Biotechnol., Jun. 1996, 5(2), pp. 114-122 (Abstract Only).

Gomez-Chiarri et al., "Introduction of foreign genes into the tissue of live fish by direct injection and particle bombardment", Diseases of Aquatic Organisms, Dis. Aquat. Org., Vo. 27, pp. 5-12, 1996.

Gomez-Chiarri et al., "Protection against reinbacterium salmoninarum infection by dna-based immunization", Aquaculture Biotechnology Symposium Proceedings, pp. 155-157, 1996.

Anderson Ed et al., "Genetic expression in rainbow trout (Oncorhynchus mykiss) following intramuscular injection of DNA", Mol. Mar. Biol. Biotechnol., Jun. 1996, 5(2), pp. 105-113 (Abstract Only).

Liu et al., "Functional analysis of elements affecting expression of the beta-actin gene of carp.", Mol. Cell. Biol., 10(7), pp. 3432-3440, 1990.

Milton et al., "Cloning of a Mettalloprotease Gene Involved in the Virulence Mechanism of Vibrio anguillarum", Journal of Bacteriology, Nov. 1992, pp. 7235-7244.

Schulte et al., "Structural and Functional Differences in the Promoter and 5'Flanking Region of Ldh-B Within and Between Populations of the Teleost Fundulus heteroclitus", Genetics, 145, pp. 759-769, Mar. 1997.

Sherf et al., "Dual-Luciferase TM Reporter Assay: An Advances Co-Reporter Technology Integrating Firefly and Renilla Luciderase Assays", Promega Notes Magazine, No. 57, 7 pages, 1996.

Ulmer et al., "DNA vaccines", Current Opinion in Immunology, 8, pp. 531-536, 1996.

Norman et al., "Development of improved vectors for DNA-based immunization and other gene therapy applications", Vaccine, vol. 15, No. 8, pp. 801-803, 1997.

Altschmied et al., "Set of Optimized Luciferase Reporter Gene Plasmids Compatible with Widely Used CAT Vectors", Biotechniques, 23, pp. 436-438, Sep. 1997.

Lorenzen et al., "Protective immunity to VHS in rainbow trout (Oncorhynchus mykiss, Walbaum) following DNA vaccination", Fish & Shellfish Immunology, 8, pp. 261-270, 1998.

Gomez-Chiarri et al., "Evaluation of eukaryotic promoters for the construction of DNA vaccines for aquaculture", Genetic Analysis Biomolecular Engineering, 15, pp. 121-124, 1999.

Verma et al., "Gene therapy- promises, problems, and prospects", Nature, 389, pp. 239-243, 1997.

Grillot-Courvalin et al., "Functional gene transfer from intracellular bacteria to mammalian cells", Nature Biotechnology, 16, pp. 862-866, 1998.

Russell et al., "Cancer gene therapy: hard lessons and new courses", Gene Therapy, 7, pp. 2-8, 2000.

*Primary Examiner*—Jennifer E Graser
(74) *Attorney, Agent, or Firm*—Gauthier & Connors LLP

(57) ABSTRACT

A method for immunizing fish against pathogenic infection is disclosed. More particularly, this invention provides a method of immunizing fish against bacterial and viral infection which comprises immersing the fish in a solution comprised of an effective amount of dead or attenuated, whole-celled recombinant bacteria, the recombinant bacteria having a eukaryotic expression vector (plasmid) incorporated therein having DNA of interest encoding at least one protein antigen for each of the pathogens, the method characterized in that the protein antigen is produced by the fish.

4 Claims, 6 Drawing Sheets

SEQUENCE LISTING

```
<160> NUMBER OF SEQ ID NOS: 5

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1

agatctcgag atctgagctt                                                20


<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2

cgcaactgca actccgataa                                                20


<210> SEQ ID NO 3
<211> LENGTH: 22
<212> TYPE: DNA
```

```
<213> ORGANISM: Artificial Sequence
<220> FEATURE:
<223> OTHER INFORMATION: Description of Artificial Sequence: Synthetic
      primer

<400> SEQUENCE: 3

cggccgtcac aaacccaact ct                                            22


<210> SEQ ID NO 4
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4

cggccgaggg tgacaaaaat aag                                           23


<210> SEQ ID NO 5
<211> LENGTH: 3588
<212> TYPE: DNA
<213> ORGANISM: Vibrio anguillarum
<220> FEATURE:
<221> NAME/KEY: modified_base
<222> LOCATION: (3572)..(3572)
<223> OTHER INFORMATION: a, c, t, g, unknown or other

<400> SEQUENCE: 5

gtcgacttat tgcattgatg gcgtacatgg tagtgccatc cttcgtttgc taacaagcgt     60

tgtataaaag cttggtcggt ttcatcaagt tgaacacaat actcatgatt tttcccactt    120

ccggaaaggg aaaagtgaaa atagcttttg agatcagcct gttctagcag cttttcaatg    180

atctttttcg tcgttacgtt ttgaaaaatc tgacgactgc gtttgtattg caacaagcta    240

agtggatcca atatctctat ttgataataa aactgctgct tgtctttgct atatcctgtg    300

aattgcagag tgctacatat acctgaaaaa aaacgctttc cagaatctaa ttcgtaagac    360

acacaaacag ctttacctag gtttttggta tcgatctcca tgtttgccgc gatggaaacg    420

gaaaactgac acccgccgga tacgctttcc tctccgatta attgcgtgac aatataactt    480

ttgctatctg aaagcttaat ggtgagggag cgggtttggt gctttaattc gttactgctc    540

atattcaatt aattcactat taaataaaca gttctaaaag gctgtttatt ggatgaatat    600

tcgaaattat cacataataa ttgatgctat tattacttgc tgtattggta tcaactttca    660

tgctctatac atgtaatata tttcgagtta gaccttaatt caaggtaatt tgtctattta    720

attattatct gaataatatg taatcgattg ctttgtggtt atttttatgt ttgtttcatt    780

tttaatgacg gtgagcttgt gcattcatat tttttatgat gacaacatct ttgatgaagt    840

atttaagata ttgttaatgc atgaggggtt tgcgtgtatt ttttatatta aatcataata    900

aaatcaacaa tatatgttat tttgtgtctt tttatagtgt tcttttaaag aggtaggatg    960

acctaaaggt cgcctaaata tggcgtaaat tgccattgct ataattcacc tcaaagatac   1020

actattggca aattgacaaa tatgtcactt cgtatgaaac aatattagta gatgttgttt   1080

ttgctgcaaa aataaaaatt tttctggttg aaataactca aggcctctag cgttttcctt   1140

tatcttaaaa tacaggaaat agcgattgaa gttaattgac acttaagcaa atagtcaacc   1200

taacagagca ggaacctatg cctttgtcaa agcatcaaat tgagcaactt tctaaacctc   1260

tgagtgatga ttcgatctgt ggcgtttatc ttaaactgga aaaaagtgct tttcgcccat   1320

tacgtaatga atttaatgtc gcgcaaactg cgctgcgtaa gctaagtcaa aaccctagtg   1380
```

-continued

```
ctgacgagag agatgcgtta caagaggcat gtctaaataa gtggaagatt ctctctgaca   1440
gtttgtacga acagttttca aaaacaacca gagatatcga gctcatctca tggtttgttg   1500
ctgctcaatt ccttctcgat accacattag aaagtgctgc gaatagcctt gagtggttag   1560
cggatttaag tgagaagcac tgggatcacc tcaaccctgt actaccagtt gaaacgctca   1620
aatctgatga tgataagggc aaagaaagag agcaagcaga tgcgaaagtt aaagcatttt   1680
tccaactagt cggcgatagc gaggaaagct cgattctcta tgcgccggtg ctgcaactgc   1740
ccttagtcgg ggaagtgacg ttttttgact ttcaaagtgc agagagaaaa ggcgaaatca   1800
gccaactgaa atctatgctt acgaccacgg tggcgcaaga gcgtttcgca attcaattca   1860
agatggaaaa cgccaaacgt tgtgtcaccc aattagatcg tttgtcagcg ttggtgagca   1920
ctaagtgtca ttctctaggc agtcaaagta ccaacttcgg atttgcgaag tcactgctta   1980
cccgtgttga aaacgctttg gttcatctaa gtggaattaa gttagcaccg aaagcggagg   2040
ccaagacagt agagcaagag gttgccgaaa gttcagtttc tgaaggggag ctgccaagcc   2100
atatggatac aaaacatata gagcgaatac cgatggcatc agagcaggct cagaccgtaa   2160
gccaacactt acacgcagga aacctctctg aactgggtaa tttaaacaat atgaaccgag   2220
acttagcttt ccatttgttg agagaagtct ctgattattt tcgccagagc gaaccgcata   2280
gcccaatttc atttttgtta gaaaaagcga ttcgatgggg atatttatcc ttacctgagt   2340
tgctgcgaga aatgatgtcg gaacaaaacg gtgacgctct tagtacgatt tttaatgccg   2400
ccggattgaa tcatctcgat caggttttgc tgccggaggt gagtactcca acggtgggca   2460
ttgaaagccc ccaaacacct caagcgaagc cttccgtttc ggatccgcga agtgttgaag   2520
agcatgtatc tcagacttcc cctgtagata cccaatctaa gcaagatcaa aaaccacaat   2580
catccgctac gtcggctctg agttggtaat tgtgtttaaa aaataaggaa aaatcatggc   2640
aagtatttac atgcgtgtaa gcggtcttca agttgagggc gcagcgacta tcggtcagct   2700
agaaacggct gaaggtaaaa atgacggttg gtttgcaatc aactcttact cttggggtgg   2760
cgctcgtaac gttgctatgg acatcggtaa cggcaccaat gcggattcag gcatggttgg   2820
cgtaagcgaa gttagcgtaa ctaaagaagt cgatggtgct tctgaagacc tactgtctta   2880
tttattcaac ccaggtaaag acggtaaaac tgttgaggtt gcatttacta agccttctaa   2940
cgatggtcaa ggtgcagacg tttacttcca agttaagcta gaaaaagcac gtttagtttc   3000
ttacaacgtg agcgggactg acggatctca accgtacgag agcctatctc tttcttacac   3060
ttctatttct cagaagcatc actatgagaa agaaggtggt gaactacaaa gcggtggtgt   3120
tgtgacttac gacctaccga ccgggaaaat gacttctggt aagtaattct ttcattagac   3180
atgccacgtt aattggcatg tctatttcat gaatatctca ttttaggaca ccgttatggc   3240
attgaactca caacataagc gcgttagtaa gaaccgtgtc agcatcacct atgacgttga   3300
aacgaatggc gccgtaaaga cgaaagagct gccgtttgtt gttggcgtca ttggcgactt   3360
ttcaggacac aaaccagaat cagaaaaagt tgatttagaa gagcgagagt tcacgggtat   3420
cgataaagac aacttcgata cagtgatggg gcaaattcac ccgcgtcttt cgtacaaggt   3480
tgataacaag cttgctaatg atgatagcca gtttgaagtg aacttgagcc tccgttcgat   3540
gaaagatttc cacccagaga acttagttga tnaaattgag ccgcttaa                 3588
```

DELIVERY OF DNA VACCINES INTO FISH BY IMMERSION

PRIORITY INFORMATION

This application is a continuation of U.S. patent application Ser. No. 09/915,615, filed on Jul. 26, 2001, now abandoned, which claims priority to U.S. Provisional Patent Application No. 60/220,733 filed on Jul. 26, 2000, all of which are incorporated herein in their entirety.

SEQUENCE LISTING

The instant application contains a Sequence Listing which has been submitted via EFS-Web and is hereby incorporated by reference in its entirety. Said ASCII copy, created on May 28, 2010, is named 5408CON.txt, and is 6,107 bytes in size.

BACKGROUND OF THE INVENTION

1. Field of the Invention

This invention relates to the control of pathogenic infections of fish, and more particularly to the administration of vaccines for such control.

2. Description of the Related Art

Infectious diseases are a major constraint to the expansion of aquaculture. The use of drugs and antibiotics in aquaculture is highly regulated in order to avoid risks to the public safety, to animal health, and to prevent the development of resistant strains of disease organisms. Consequently, the farmer is left with few resources like vaccination, early diagnosis, and good husbandry techniques.

DNA immunization constitutes a new and promising approach to vaccination. It consists in the introduction of a plasmid vector mediating expression of antigen/s into the tissue of an animal in order to elicit an immune response (Ulmer J B, Sadoff J C, Liu M A. DNA vaccines. *Curr Opin Immunol* 1996; 8:531-6). It has been shown that DNA immunization provides protection against infection by a variety of pathogens, including protection of rainbow trout against infection by infectious hematopoietic necrosis virus (Anderson E D, Mourich D V, Fahrenkrug S C, LaPatra S, Sheperd J, Leong Jo-AC. *Mol Mar Biol Biotech* 1996; 5:114-22), viral hemorrhagic septicemia (Lorenzen N, Lorenzen E, Einer-Jensen K, Heppell J, Wu T, Davis H. *Fish Shellfish Immunol* 1998; 8:261-270), and bacterial kidney disease (Gómez-Chiarri M, Brown L L, Levine R P. In: Aquaculture Biotechnology Symposium Proceedings. Physiology Section of the American Fisheries Society, 1996; 155-157). DNA immunization is especially attractive for the development of vaccines against diseases caused by virus, parasites, and intracellular pathogens, where T cells are the central mediators of protection and pathology.

Two major roadblocks to the licensing and commercialization of DNA vaccines for aquaculture are the availability of safe and efficacious expression vectors and economic and efficient methods of delivery. The Center for Biological Evaluation and Research (CBER) of the Food and Drug Administration (FDA) has released a draft of points to consider in designing DNA vaccines (See "Points to consider on plasmid DNA vaccines for preventive infectious disease indications" published December 1996 by the U.S. Food and Drug Administration Center for Biologics Evaluation and Research Office of Vaccine Research and Review). Of concern is the source of the DNA incorporated into the vector, including eukaryotic promoters and enhancers; termination/polyadenylation addition sites; antibiotic resistance markers; and other selection markers. In considering the use of an antibiotic resistance marker CBER is advising manufacturers against the use of penicillin or other β-lactam antibiotics. When an antibiotic resistance marker is required in a plasmid DNA vaccine construct, CBER advises the use of an antibiotic such as kanamycin or neomycin. These aminoglycoside antibiotics are not extensively used in the treatment of clinical infections due to their low activity spectrum, prevalence of kanamycin-resistant bacteria, and their problematic therapeutic index with toxicities including irreversible citotoxicity and nephrotoxicity. Furthermore, although the use of viral promoters and mammalian and viral termination and polyadenylation signals in the design of DNA vaccines is not a main consideration in the CBER draft, there is a general public concern on the use of viral and mammalian sequences in agricultural products.

Concerning the routes of administration, previous studies in the development of DNA vaccines for fish have used direct injection of naked DNA as a method of vaccine delivery into the fish. This method of DNA delivery is efficient and simple, but requires fish handling. Alternative methods for vaccine delivery that are simple and more economic include bath and immersion. However, the efficacy of the bath and immersion methods is reduced because the water and the skin and mucus of the fish are abundant in enzymes that can degrade DNA.

The present invention provides the tools for an effective and economic method for the delivery of DNA vaccines into finfish and other aquatic species.

BRIEF SUMMARY OF THE INVENTION

Broadly, this invention provides a method of inducing an immune response in a fish against one or more pathogens which comprises transforming a bacterium with a plasmid comprising DNA of interest encoding at least one protein antigen for each of the pathogens, killing the bacterium, and immersing the fish in a solution comprised of the dead, whole celled, bacterium to effect the expression of the protein antigen by the fish. The methods of this invention are useful for inducing an immune response in species of finfish, such as salmonids, catfish, tilapia, seabass, seabream, cod, haddock, flatfish species, such as flounder, turbot and halibut, and other aquatic species, such as shellfish, e.g. shrimp, lobsters and crabs, against bacterial and viral pathogens such as *Vibrio* spp, *Aeromonas* spp, *Pisciricketsia salmonis, Renibacterium salmoninarum*, Infectious Hematopoietic Necrosis Virus, Infectious Pancreatic Necrosis Virus, and Viral Hemorrhagic Septicemia.

The invention also comprises a method of inducing an immune response in a fish against one or more pathogens which comprises immersing the fish in a solution comprised of a live, whole-celled recombinant bacterium, the bacterium having incorporated therein a plasmid comprising DNA of interest encoding at least one protein antigen for each of the pathogens to effect the expression of the protein antigen by the fish.

In another aspect of the invention, the plasmid comprises an eukaryotic promoter, a polyadenylation signal of fish origin and DNA of interest encoding at least one protein antigen from a fish pathogen. DNA of interest encoding at least one protein from a fish pathogen includes the p57 gene from *Renibacterium salmoninarum*, the empa gene from *Vibrio anguillarum*, the aspa gene from *Aeromonas salmonicida*, the omp48 and omp38 genes from *Aeromonas veronii*, and the genes coding for the G proteins from the Infectious Hematopoietic Necrosis Virus and the Viral Hemorrhagic Septiceamia Virus. The eukaryotic promoter is a carp beta-actin promoter. Other suitable promoters can include constitutive or inducible promoters such as the *Fundulus heteroclitus* lactate dehydrogenase-B promoter, and the winter flounder antifreeze protein promoter.

Suitable poly-A sequences of fish origin, which increase the efficacy of the DNA vaccine plasmid for aquaculture, include poly-A signals from the medaka (*Oryzias latipes*) and carp (*Ctenopharyngodon idetla*) beta-actin genes and the antifreeze protein poly-A signal from various fish species such as the wolfish (*Anarhichas tupus*), ocean pout (*Macrozoarces americanus*), and winter flounder (*Pseudopleuronectes americanus*).

In another aspect of the invention, the plasmids comprise a carp beta-actin promoter, a polycloning site to facilitate the cloning of antigenic genes, a poly-A signal from a gene of fish origin, and a kanamycin gene for selective antibiotic resistance in bacterial culture of the plasmid.

In yet another aspect of the invention, the plasmid comprises a eukaryotic expression vector and a broad host range origin of replication for the transformation of bacteria pathogenic to fish. The bacterium is selected from the group consisting of *E. coli, Vibrio anguillarum*, and *Aeromonas salmonicida*. Other bacteria can include, but are not restricted to, mutated or wild-type *Vibrio* spp, *Yersinia ruckeri, Aeromonas veronii, Aeromonas hydrophila*, and *Edwardsiella ictaluri*.

In another aspect of the invention, the bacterium is comprised of a nonpathogenic strain of *V. anguillarum*. The nonpathogenic strain of *V. anguillarum* is characterized in that it is incapable of expressing a functional mugA protein.

Another aspect of the invention comprises immersing the fish in a solution comprised of $10^{10}$ cells/liter formalin-killed transformed bacteria for about five minutes.

The invention also comprises a method for the delivery of DNA in a fish comprising transforming a bacterium with a plasmid comprising DNA of interest which encodes a protein, immersing the fish in a solution comprised of the dead, whole celled, or live bacterium to effect the production of the protein by the fish. This method is useful in that the plasmids used to transform the bacteria can be engineered to include DNA of interest that encodes for protein antigens for pathogens of the fish using standard molecular procedures known in the art thereby effecting the expression of protein antigens in the fish tissue to elicit an immune response. The plasmids can be engineered to comprise DNA of interest encoding at least one protein from a fish pathogen selected from the group consisting of the p57 gene from *Renibacterium salmoninarum*, the empa gene from *Vibrio anguillarum*, the aspa gene from *Aeromonas salmonicida*, the omp48 and omp38 genes from *Aeromonas veronii*, and the genes coding for the G proteins from the Infectious Hematopoietic Necrosis Virus and the Viral Hemorrhagic Septiceamia Virus.

The invention also comprises the plasmids used in the method for the delivery of DNA in a fish which comprise a promoter of fish or viral origin, a polyadenylation signal of fish or viral origin and an antibiotic resistance marker.

BRIEF DESCRIPTION OF THE DRAWING(S)

FIGS. 1*a*-1*d* depict graphs of the luciferase expression in Atlantic salmon tissue at various time points after immersion in formalin-killed transformed *E. coli* or naked DNA, including those of gill, liver, spleen, kidney;

FIGS. 2*a*-2*c* depict a comparison of the different routes of DNA delivery into Atlantic salmon tissues, including those of head, liver, trunk;

FIGS. 3*a*-3*c* depict graphs of the effect of immersion in varying concentrations of formalin-killed transformed *E. coli* or naked DNA on luciferase expression in Atlantic salmon tissue, including those of muscle, gill, kidney;

FIGS. 4*a*-4*c* depict graphs of the effect of immersion time on luciferase expression in salmon tissue, including those of head, liver, and trunk;

DESCRIPTION OF THE PREFERRED EMBODIMENT(S)

Figure 1A:
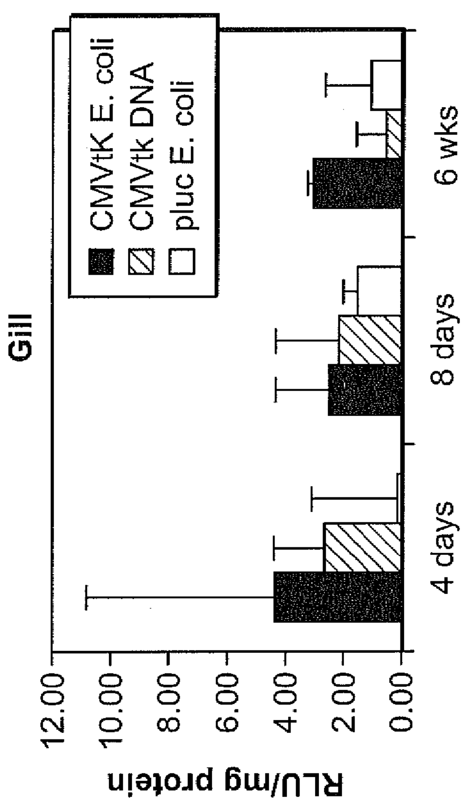
Figure 1B:
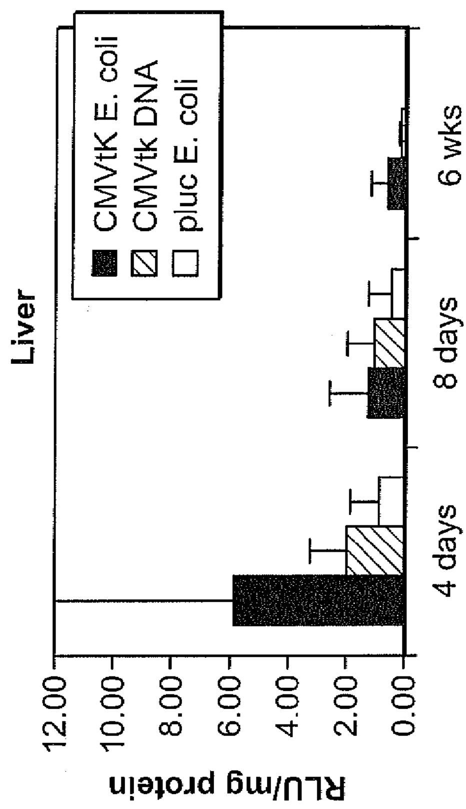
Figure 1C:
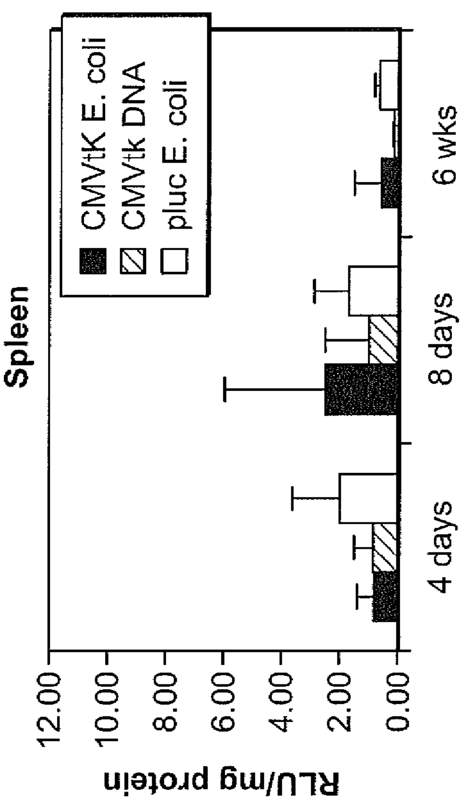
Figure 1D:
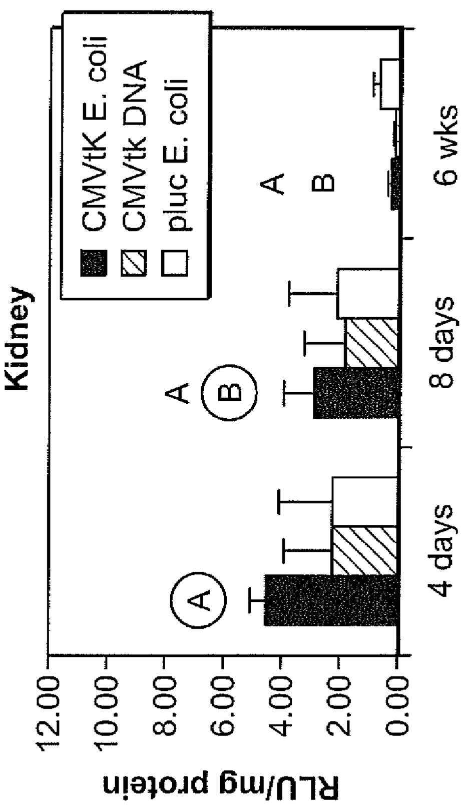

The invention will now be described with reference to the following non-limiting examples.

Methods & Materials

Fish

Atlantic salmon (*Salmo solar*) were obtained from the Aquaculture Research Center at East Farm, University of Rhode Island (Kingston, R.I.) and maintained in freshwater tanks at a water temperature of 10-16° C.

Evaluation of Immersion as an Administration Route for DNA Vaccines for Fish

Different immersion methods were evaluated for their efficiency in delivering the DNA of an expression vector (plasmid DNA) into the fish. Groups of fish were immersed in solutions of: (i) naked test or control plasmid DNA, (ii) formalin-killed *E. coli* transformed with test or control plasmid, or (iii) live *E coli* transformed with test or control plasmid. The pCMVtkluc plasmid was used as a test plasmid for the immersion studies because: (1) the cytomegalovirus (CMV) promoter/enhancer has been shown to be a highly efficient promoter system, and (2) it has been used in previous research on the comparison of delivery routes for DNA vaccines. Three types of negative controls were used: fish were either (a) immersed in phosphate buffered saline (PBS); (b) immersed in the promoter-less plasmid pluc as naked DNA, formalin-killed *E. coli* transformed with pluc or live *E. coli* transformed with pluc; or (c) injected intramuscularly with naked pluc plasmid DNA. The positive control consisted of fish intramuscularly injected with pCMVtkluc. Each experiment was performed once or twice as indicated in the figures and data was averaged for statistical purposes.

Preparation of Immersion Solutions

Competent JM-109 *E. coli* cells (Promega) were transformed with the plasmids pCMVtkluc or pluc using a standard heat-shock protocol (Sambrook et al., Molecular Cloning: A Laboratory Manual. 2nd ed., New York, 1989). Transformants were cultured overnight at 37° C. with agitation until they reached concentrations of approximately $10^{10}$-$10^{11}$ cells/l (see Table 3). DNA was extracted using an alkaline lysis protocol and purified through a silica/salt matrix (RPM 4G Mini-Monster Prep. Bio 101, Vista, Calif., USA) following manufacturer's instructions. Concentrations of DNA were determined by absorbance readings at 260 nm (Beckman DU-8B UV-Visible Spectrophotometer, Beckman Instruments Inc., Irvine, Calif.) and purity was calculated by a ratio of the absorbances at 260 nm and 280 nm. DNA was then resuspended to experimental immersion concentrations.

Transformed *E. coli* cultures to be formalin killed were cultured overnight at 37° C. with agitation until they reached concentrations of approximately $10^{10}$-10" cells/l. The cells were then centrifuged for 10 minutes at 5,600×g, resuspended in a 1/10 volume of 0.4% formalin/phosphate buffered saline (PBS) and incubated overnight at approximately 4° C. with mild agitation. Formalin-killed bacteria were washed three times and their concentration was determined by absorbance readings at 600 nm (1 $OD_{600}=10^8$ cells/ml). Bacteria were then resuspended in PBS to experimental immersion concentrations. To verify total loss of viability, an aliquot of bacterial cells was plated on Luria-Bertani (LB) agar and incubated overnight at 37° C.

Cultures used for live transformed *E. coli* immersions were grown overnight at 37° C. with agitation until they reached concentrations of approximately $10^{10}$-$10^{11}$ cells/l. The cells were then centrifuged for 10 minutes at 5,600×g and concentrations were determined as above. Bacteria were then resuspended in PBS to experimental immersion concentrations. To verify the preservation of viability, an aliquot of bacterial cells was plated on LB agar and incubated overnight at 37° C.

Temporal and Tissue Patterns of Expression after Immersion

Three groups of Atlantic salmon (4-6 g, n=18 per group) were anesthetized in 20 mg/l MS-222 until opercular and muscular movement decreased. The adipose fin, right or left maxilla or combinations of the three areas were clipped to indicate the type of immersion each fish received. After recovering from anesthesia, fish were immersed for 1 minute in either $10^{10}$ cells/l formalin-killed *E. coli* transformed with either pluc of pCMVtkluc DNA (see Table 2), or 1 mg/l naked pCMVtkluc DNA. The fish were then quickly rinsed in a bucket of water and put into one of three recirculating freshwater tanks. Fish were segregated into each tank by the type of immersion received. An additional tank was used to house fish not exposed to any of the immersions. Six fish from each group were euthanized by an overdose of 50 mg/l MS-222 at 4 days, 8 days and 6 weeks post immersion. At day 8, samples were also taken from control fish not immersed in DNA or *E. coli* solutions. Samples from four tissues were excised from each fish: kidney, gill, liver and spleen. These tissues were chosen because they are known to function either immunologically or in the filtration of body fluids. After excision, a sample from each tissue was homogenized in 0.5 ml Passive Lysis Buffer (Promega) and frozen at −20° C. until assaying. An additional sample from each tissue excised on day 8 was flash frozen in dry ice/ethanol and kept at −20° C. until polymerase chain reaction analysis was conducted.

Determination of Plasmid DNA Presence in Tissues after Immersion

Polymerase chain reaction (PCR) analysis was used to determine the presence of plasmid DNA in the tissues 8 days after immersion. Primers were designed to amplify a 400 by region of the luciferase gene (LUC1FOR: 5' AGA TCT CGA GAT CTG AGC TT 3' (SEQ ID NO: 1); LUC2REV: 5' CGC AAC TGC AAC TCC GAT AA 3' (SEQ ID NO:2)). Twenty-five microliter reactions were conducted consisting of 22.5 μl PCR supermix (Gibco LifeTechnologies, mc, Rockville, N4D, USA, see Table 2 for composition), 1 μM of each primer, and 50 ng template fish tissue DNA. The thermocycler (PTC-200 DNA Engine, MJ Research, Inc., Watertown, Mass., USA) was programmed for an initial DNA denaturation step of 3 minutes at 94° C. followed by thirty-six cycles of a 1-minute denaturation step at 92° C., a primer annealing step of 58° C. for 1 minute, and an elongation step of 72° C. for 1 minute. The cycles were followed by a final extending step of 75° C. for 5 minutes to fill the protruding ends of the PCR products. Samples were then run on a 0.7% agarose gel for 1 hour at 80 volts.

Determination of Luciferase Expression in Tissues after Immersion

The Luciferase Assay System (Promega) was used to assay luciferase levels in the tissue extracts. Tissue samples were thawed to room temperature and centrifuged at 5,600×g for 10 minutes to pellet cellular debris. Twenty microliters of cell lysate were added to 50 μl of Luciferase Assay Reagent (Promega. proprietary) in a 12×50 mm polypropylene luminometer tube (Turner Designs) and pipetted to mix. The tube was placed in the luminometer for measurement of luminescence. The measurement time consisted of a three second delay and an eleven-second reading. As an internal control, total protein content in the lysate of each sample was measured using the Bradford protein assay (Bradford, 1976; Bio-Rad. Hercules, Calif., USA). Results are expressed as ratio of Relative Luminescence Units per milligram of protein in tissue lysate (RLU/mg protein). All data were statistically analyzed using one-way ANOVA; post-hoc Tukey tests were conducted where significance was detected (Keppel, Design and Analysis: A Researcher's Handbook. 3rd ed. New Jersey, 1991).

Comparison of DNA Delivery Methods: Immersions in Live or Killed Transformed *E. Coli* or Naked DNA Vs. Intramuscular Injection Fish (0.5-1.7 g, n=12 per group) were immersed for 1 minute in either $10^7$ cells/l formalin-killed transformed *E. coli* or live transformed *E. coli*, or 1 mg/l naked DNA and rinsed after immersion. Fish injected or immersed in similar conditions were maintained in the same tank with the associated negative control; i.e., fish immersed in live *E. coli* transformed with pluc and fish immersed in live *E. coli* transformed with pCMVtkluc. Fish were sacrificed four days after immersion and divided into 3 sections: head, liver and trunk. The sections of the body were homogenized in various amounts of Passive Lysis Buffer dependent upon size of section: head −1.0 ml, liver −0.5 ml, and trunk −2.0 ml. Tissue samples were then stored at −20° C., processed, and assayed for luciferase and protein levels as previously described. Data was statistically analyzed with t-tests or ANOVA; post-hoc Tukey tests were conducted where significance was detected.

Optimization of Dose for Naked DNA and Transformed *E. coli* Concentrations

To determine the optimal concentrations of naked DNA or formalin-killed transformed *E. coli* for delivery of the expression vector by immersion, fish (4-6 g; n=10 per group) were immersed in various concentrations of DNA or transformed killed *E. coli* for 1 minute. The concentrations of naked DNA tested were 0.1 mg/l, 1.0 mg/l and 5.0 mg/l; the concentrations of formalin-killed transformed *E. coli* were $10^3$, $10^7$ and $10^{10}$ cells/l. After immersion fish were rinsed and those fish immersed in DNA were divided into two groups and maintained in separate tanks. Fish immersed in *E. coli* were also divided into two groups and maintained in two tanks separate from fish immersed in DNA. Fish were sacrificed 4 days after immersion and samples of five tissues were excised: muscle, gill, liver, spleen and kidney. The samples were homogenized in 0.5 ml Passive Lysis Buffer, stored at −20° C., processed, assayed for luciferase and protein levels, and statistically analyzed as previously discussed.

Optimization of the Length of Immersion Time

The effect of the length of immersion time on luciferase expression was tested by immersing the fish (0.5-1.7 g) for various amounts of time (1 minute, 5 minutes, 6 hours, 12 hours and 24 hours) in solutions of $10^{10}$ cells/l formalin-killed pCMVtkluc- or pluc-transformed *E. coli* or PBS. Aeration was provided for the length of immersion. As a positive or negative control, fish were injected with pCMVtkluc or pluc, respectively. Each group of fish (n=10) immersed for the same time period and using the same delivery method was maintained in the same tank; i.e., fish immersed in pCMVtkluc- or pluc-transformed *E. coli* for 1 minute were maintained together. Fish were sacrificed four days after immersion and divided into 3 sections: head, liver and trunk. The sections of the body were homogenized in various amounts of Passive Lysis Buffer dependent upon size of section: head −1.0 ml, liver −0.5 ml, and trunk −2.0 ml. All tissues were then stored at −20° C., processed, assayed for luciferase and protein levels, and statistically analyzed as previously discussed.

Evaluation of Promoter and Polyadenylation Sequences for the Construction of DNA Vaccines for Fish Construction of the Plasmids

TABLE 1

| | promoter | Polyadenylation signal | antibiotic resistance | backbone | luciferase gene |
|---|---|---|---|---|---|
| I. Control Plasmids | | | | | |
| pluc[6] | — | SV40 splice+ | ampicillin | — | not optimized |
| pCMVtkluc | CMVtk | SV40 splice+ | ampicillin | pluc | not optimized |
| pVRluc | — | mRBG | kanamycin | pVR-1255 | optimized[1] |
| pVR1255[2] | CMV | mRBG | kanamycin | — | optimized[1] |
| pRL-CMV[3] | CMV | SV40 | ampicillin | — | — |
| II. Test Plasmids | | | | | |
| pLDH500luc[4] | LDH | SV40 splice+ | ampicillin | pine | not optimized |
| pCBACTluc[7] | carp beta-actin | SV40 splice+ | ampicillin | pluc | not optimized |
| pJL3 | Carp beta-actin | Wolf fish AFP | kanamycin | pluc | not optimized |
| pJGJl | CMV[5] | BGH[5] | tetracycline | pACYC184 | optimized |
| pVRCBACTluc | carp beta-actin | mRGB | kanamycin | pVR-1255 | optimized[1] |

AFP anti freeze protein
BGH bovine growth hormone
CMVtk: cytomegalovirus early enhancer + herpes simplex virus thymidine kinase promoter
CMV: cytomegalovirus immediate early enhancer promoter
inRBG: minimal rabbit beta globin
LDH: lactate dehydrogenase-B promoter
SV40: Simian virus 40
[1] Norman et al., Development of Improved Vectors for DNA-based Immunizations and other Gene Therapy Applications. Vaccine. , 15: 801-803, 1997.
[2]Vical
[3]Promega
[4]Schulte et al., Structural and functional differences in the promoter and 5' flanking region of LDH-B within and between populations of the teleost *Fundulus heteroclitus*, Genetics, 145: 759-769.
[5]From pCDNA3, Invitrogen
[6]Altschmied,J. and Duschl,J. Set of optimized luciferase reporter gene plasmids compatible with widely used CAT vectors. BioTechniques 23 (3), 436-438 (1997).
7 Gomez-Chiarri et al., Evaluation of eukaryotic promoters for the construction of DNA vaccines for aquaculture. Genet Anal 15:121-124 (1999).

Figure 7:
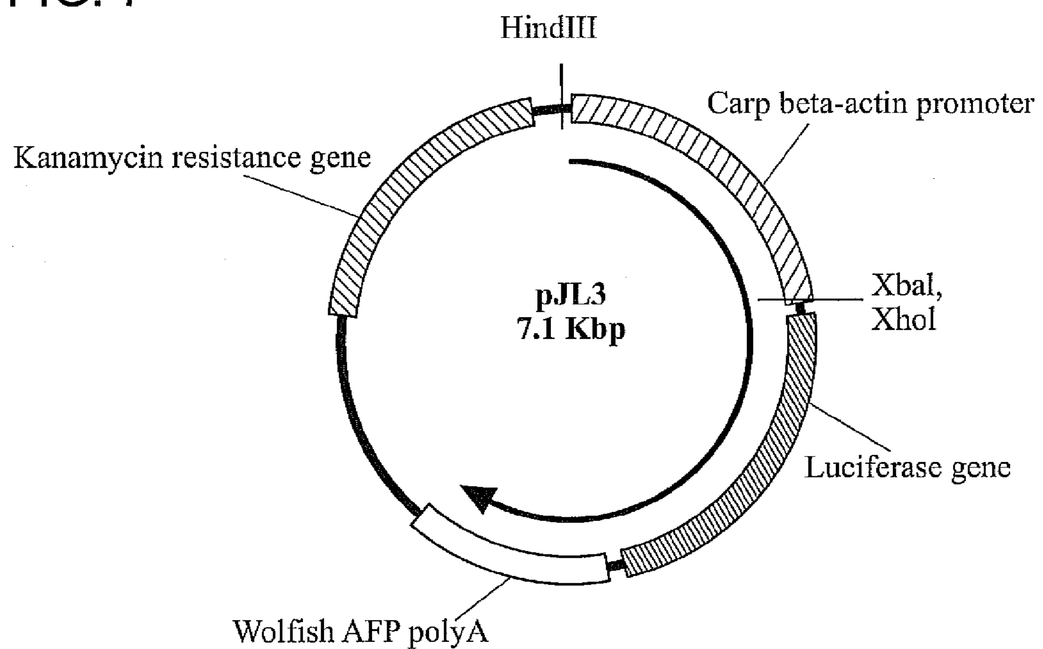
FIG. 7 depicts a map of the plasmid pJL3.
Figure 8:
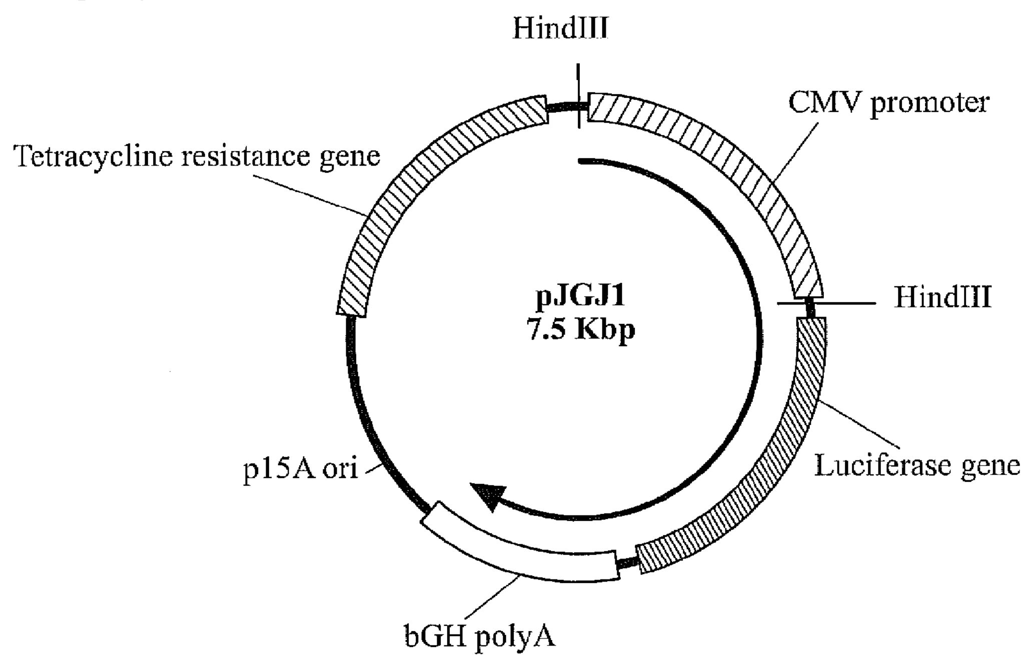
FIG. 8 depicts a map of the plasmid pJGJ1.

The following plasmids were used to investigate the efficiency of different regulatory sequences in driving the expression of the luciferase gene: pluc, pCMVtkluc. pLDH500luc, pCBACT1uc, pVRluc, pVR1255, pVRCBACT1uc, pRL-CMV, pJGJ1 (see Table 1 for plasmid components and FIGS. 7-8 for maps of pJL3 and pJG1). The plasmids pCBACTluc, pVRCBACT1uc and pVRluc were constructed using standard molecular procedures (Sambrook et al., Molecular Cloning: A Laboratory Manual. 2$^{nd}$ ed., New York, 1989) and were verified using restriction mapping and automated sequencing (Keck Biotechnology Center, Yale University, Conn.). Reagents for subcloning and restriction enzyme digestion were purchased from Promega (Madison, Wis., USA) and New England BioLabs (Beverly, Mass., USA) unless stated otherwise.

To construct pCBACT1uc, a 1.35 kb fragment containing the proximal promoter from the beta-actin gene (Liu et al., Functional analysis of elements affecting expression of the B-actin gene of carp, *Molecular and Cellular Biology.,* 10: 3432-3440, 1990) was isolated from pP3 PalacZ-CarpβA using the restriction enzymes HindIII and SalI and subcloned into pluc linearized with HindIII and SalI. pVRCBACT1uc was constructed using pVR1255 as a backbone (Vical Inc., San Diego, Calif., USA) (Norman. et al., Development of Improved Vectors for DNA-based Immunizations and other Gene Therapy Applications. *Vaccine* 15: 801-803, 1997). pVR1255 contains a luciferase gene optimized for higher levels of expression in mammals. The 1.35 kb carp beta-actin promoter was isolated from pCBACTluc using HindIII and SalI restriction enzymes, and subcloned into the blunt-ended EcoRV site in pVR1255. Clones were selected for correct promoter orientation by restriction enzyme mapping. The cytomegalovirus (CMV) promoter in pVR1255 was then removed by partial digestion with AseI. The resulting 6.8 kb fragment was isolated from a 0.7% agarose gel and re-ligated using T4 DNA ligase.

pVRluc was a promoter-less negative control for the test plasmid pVRCBACTluc. To remove the beta-actin promoter, pVRCBACT1uc was partially digested with AseI. The linearized 6.8 kb fragment was isolated from an 0.7% agarose gel, purified through a Qiagen column (QIAquick Gel Extraction Kit, Qiagen, Valencia, Calif., USA), completely digested with PstI, and blunt-ended with T4 DNA polymerase. The resulting 5.45 kb DNA fragment was isolated from a 0.7% agarose gel and re-ligated with T4 DNA ligase.

In Vivo Assays of Promoter/Poly-A Signal Activity

The efficiency of different promoters and polyadenylation sequences in driving expression of the firefly luciferase gene (*Photinus pyralis*) in fish was determined in vivo by transfection of the muscle of live Atlantic salmon (*Salmo solar*) (Gómez-Chiani et at., Introduction of foreign genes into tissue of live fish by direct injection and particle bombardment, *Diseases of Aquatic Organisms.* 27: 5-12, 1996). An internal control plasmid was co-injected with the experimental and control plasmids into the muscle of different groups of Atlantic salmon. The internal control, pRL-CMV (Promega, Madison, Wis., USA), was co-injected to enable assay and evaluation of differences in transfection efficiency. pRL-CMV encodes a sea pansy luciferase (*Renilla reniformis*) that evolved separately from the firefly luciferase encoded in the plasmids being tested; therefore, it requires a different substrate for catalysis (Sherf et al., Dual-Luciferase reporter assay: an advanced co-reporter technology integrating firefly and *Renilla* luciferase assays. *Promega Notes.* 49: 14+, 1996). This enables the two luciferase enzymes to be assayed simultaneously within the same tube using the Dual Luciferase Assay System (Promega).

Atlantic salmon (45-65 g, n=6-10 per group) were anesthetized with 20 mg/l of 3-aminobenzoic acid ethyl esther (MS-222) (Sigma, St. Louis, Mo., USA). When opercular and muscular movement decreased, fish were removed from the anesthetic and placed on a flat surface. Plasmids were injected into the muscle of fishat the midpoint between the front of the dorsal fin and the lateral line. Injections were composed of 5 μg of pRL-CMV and 25 μg of either test or control plasmid in a total volume of 50 μl phosphate buffered saline (PBS). Approximately 1 μl of water-based, non-toxic indicator dye (Tempera paint, Binney & Smith. Inc. Easton, Pa., USA) per fish was vortexed into the DNA mixture to facilitate visualization of the injection area. Fish were then returned to an aerated, flow-through freshwater tank of 13° C. and allowed to recover. Fish were euthanized four and eight days post-injection using an overdose (>50 mg/l) concentration of MS-222. When opercular and muscular movement ceased, the animals were removed from the anesthetic and sacrificed by severing the dorsal spine at the base of the head. Indicator dye co-injected with the plasmid DNA facilitated visualization and excision of muscle tissue in the area of injection (approximately 0.19 cm $0.5^3$×0.75×0.5 cm). The excised tissue was homogenized (PowerGen 125 Homogenizer, Fisher Scientific) in 0.5 ml Passive Lysis Buffer (Promega, proprietary). Samples were stored at −20° C. until assayed for luciferase activity.

Tissue samples were thawed to room temperature and centrifuged for 15 minutes at 11,200×g to pellet cellular debris. Five microliters of cell lysate was added to 50 μl of Luciferase Assay Reagent II (Promega, proprietary) in a 12×50 mm polypropylene luminometer tube (Turner Designs, Sunnyvale, Calif., USA) and pipetted to mix. The tube was immediately placed in a TD-20/20 Luminometer (Turner Designs) and luminescence was measured following manufacturer's instructions. The measurement time consisted of a three-second delay and an eleven-second reading. After an initial reading which measured the luminescence of the firefly luciferase in relative luminescence units (RLU), 150 μl of Stop & Glo Reagent (Promega proprietary) was added to the mixture. The tube was vortexed for two seconds and immediately placed in the luminometer. The second reading measured RLU of the sea pansy luciferase encoded by the internal control plasmid pRL-CMV and also consisted of a three-second delay and an eleven-second reading. A ratio of firefly luciferase to sea pansy luciferase was calculated from this data. All data were statistically analyzed using one-way ANOVA. Post-hoc Tukey tests were conducted where significance was detected (Keppel, Design and Analysis: A Researcher's Handbook. 3rd ed. New Jersey, 1991).

Results

Evaluation of Immersion as an Administration Route Temporal and Tissue Patterns of Expression after Immersion Determination of Plasmid DNA Presence in Tissues after Immersion PCR analysis revealed the presence of a 400 by region of the luciferase gene from pCMVtkluc or pluc in the four tissues sampled (gill, liver, spleen and kidney) after fish had been immersed in either (1) formalin-killed *E. coli* transformed with pCMVtkluc. (2) formalin-killed *E. coli* transformed with pluc or (3) naked pluc DNA. Analysis of the negative control fish (not immersed) demonstrated that the luciferase gene was not present in the tissues of those fish.

Determination of Luciferase Expression in Tissues after Immersion

Referring to FIGS. 1 *a-d*, fish were immersed for 1 minute in either $10^7$ cfu/l of formalin-killed E transformed with pCMVtkluc or pluc, or 1 mg/l of naked pCMVtkluc DNA. Luciferase expression was measured 4 days, 8 days, and 6 weeks after immersion in samples of (a) gill (b) liver, (c) spleen, and (d) kidney. Results are expressed as a ration of firefly luciferase expression (RLU) to mg of protein in 1 ml of tissue lysate±standard deviation of the mean of two experiments, n=18 per group. Statistical differences were found between circled and non-circled letter pairs ($p<0.05$).

Luciferase expression was variable depending upon the tissue sampled (FIG. 1). Although not statistically significant due to high variance in the values of luciferase, the following trends were observed: (1) Increased levels of luciferase expression compared to the controls were observed in the gill, liver and kidney four days after immersion in killed *E. coli* transformed with pCMVtkluc. (2) Luciferase expression in most tissues was higher after immersion in transformed *E. coli* compared to immersion in naked DNA. (3) Luciferase expression decreased over time with the highest levels detected at 4 days and no expression detected by 6 weeks after immersion. This difference is statistically significant in the kidney of fish immersed in *E. coli* transformed with pCMVtkluc ($p<0.05$).

Comparison of DNA Delivery Methods: Immersions in Live or Killed Transformed *E. Coli* or Naked DNA Vs. Intramuscular Injection Referring to FIGS. 2 *a-c*, fish were either (1) immersed for 1 minute in $10^7$ cfu/l of formalin-killed transformed *E. coli*, (2) immersed for 1 minute in $10^7$ cfu/l of live transformed *E. coli*, (3) immersed for 1 minute in 2.5 mg/l naked DNA, or (4) injected intramuscularly with 5 μg of naked DNA. Luciferase expression was measured in (a) head, (b) liver, and (c) trunk, 4 days after immersion. Results are expressed as a ratio of firefly luciferase expression (RLU) to mg of protein±standard deviation of the mean of two experiments, n=12 per group. Statistical differences were found between circled and non-circled letter pairs ($p<0.05$).

Figure 2A:
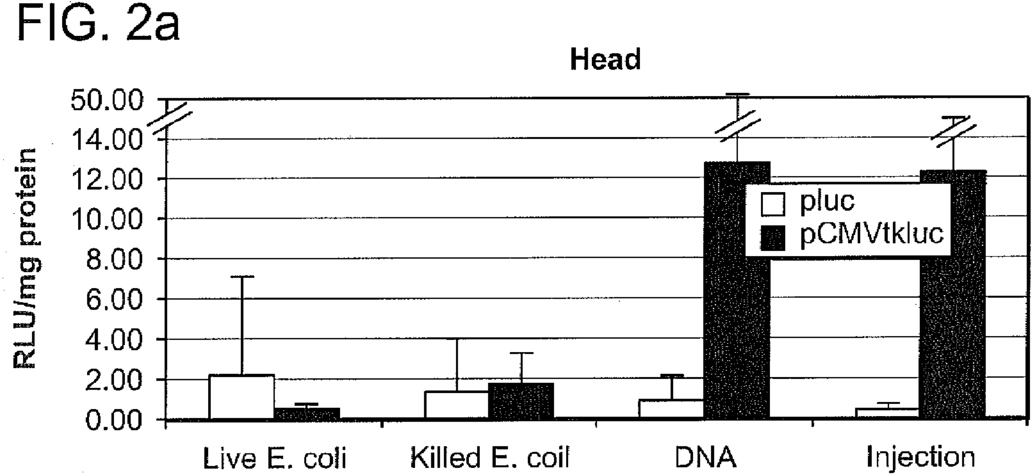
Figure 2B:
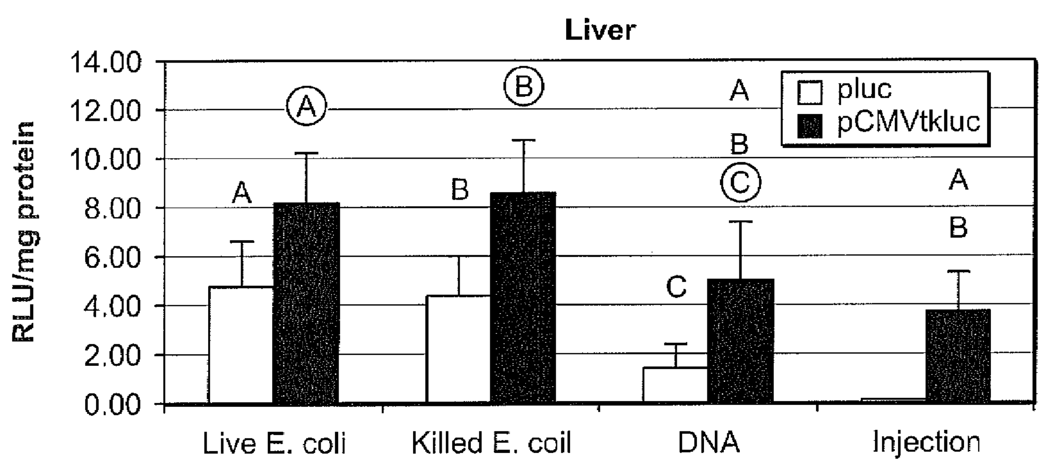
Figure 2C:
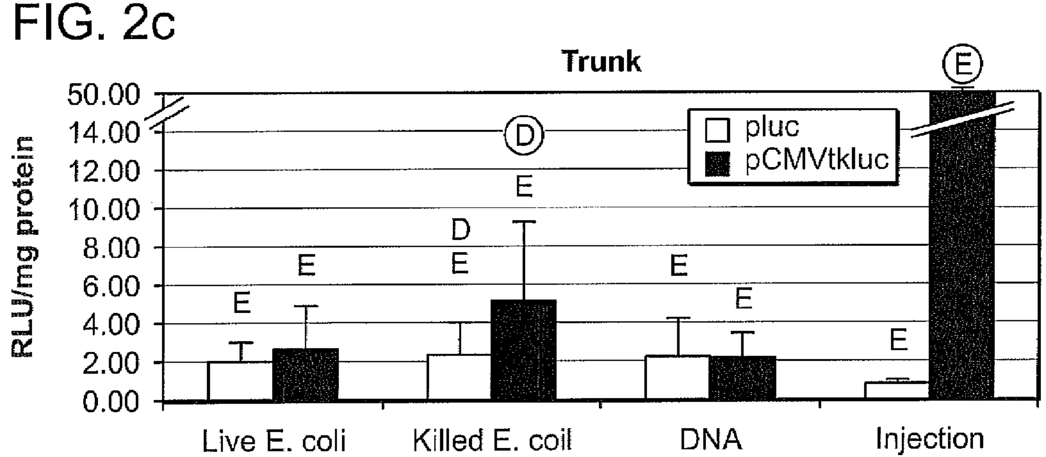

The highest levels of luciferase expression were observed in the trunk of fish injected intramuscularly with pCMVtkluc DNA ($p<0.05$ compared to corresponding control, FIG. 2 *c*). Luciferase expression was statistically higher in the liver and trunk of fish immersed in killed *E. coli* transformed with pCMVtkluc when compared to their respective negative controls ($p<0.05$) (FIGS. 2 *b-c*). A similar and significant increase in levels of expression was observed in the livers of fish immersed in either killed or live *E. coli* transformed with pCMVtkluc ($p<0.05$). Additionally, expression in the liver of fish immersed in either of these two solutions was significantly higher than expression after pCMVtkluc injection or immersion in naked DNA ($p<0.05$) (FIG. 2 *b*). Increased expression was also observed in the head and liver of fish immersed in naked DNA compared to the negative controls (liver, $p<0.05$) (FIGS. 2 *a-b*). Overall, levels of luciferase expression four days after exposure were highest in the trunk after intramuscular injection; lower but still significantly increased compared to controls in the liver after immersions in either live or formalin-killed *E. coli*; and elevated in the head when fish were immersed in naked DNA.

Optimization of Dose for Naked DNA and Transformed *E. coli* Concentrations

Figure 3A:
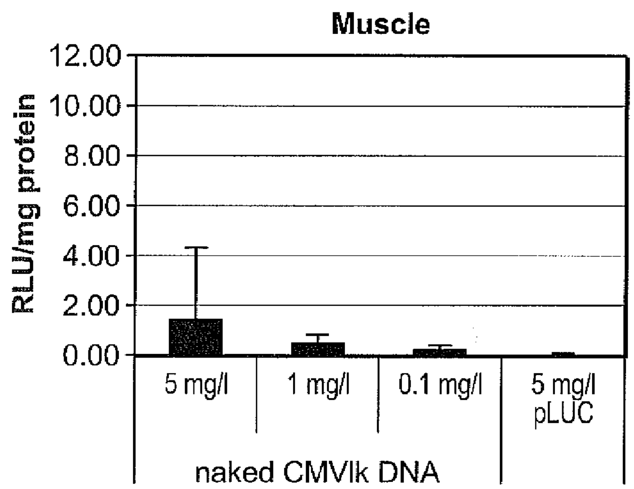
Figure 3B:
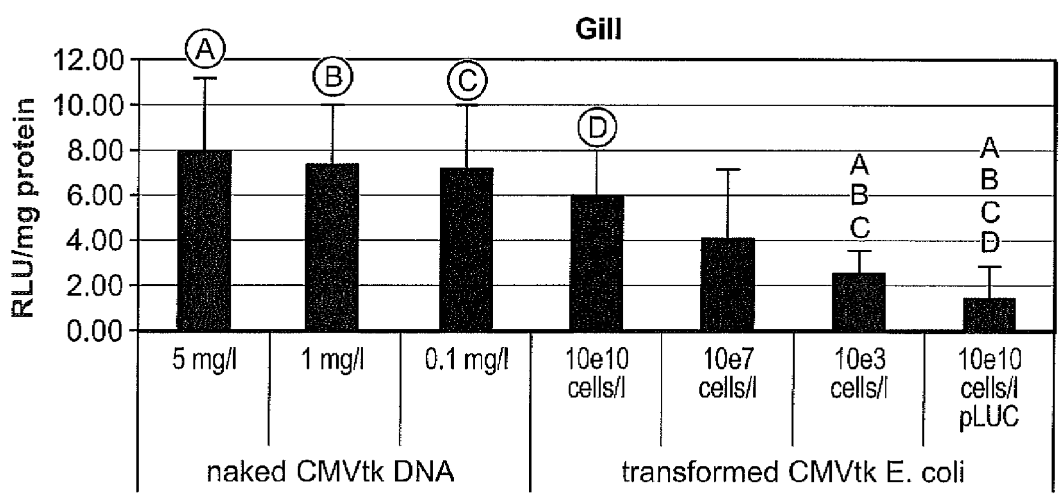
Figure 3C:
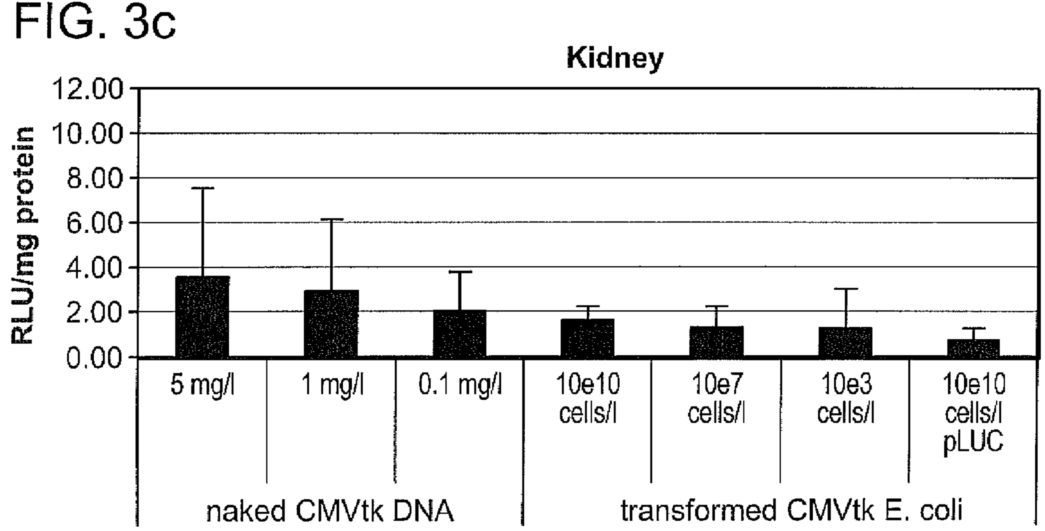

Referring to FIGS. 3 *a-c*, fish were immersed for 1 minute in varying concentrations of naked DNA or transformed *E. coli*. Luciferase expression was measured 4 days after immersion in samples of (a) muscle (b) gill, and (c) kidney. Results are expressed as a ratio of firefly luciferase expression (RLU) to mg of protein standard deviation. *E. coli* values are the mean of two experiments, n=8 per group. Statistical differences were found between circled and non-circled letter pairs ($p<0.05$).

To determine the optimal concentrations of naked DNA and formalin-killed, transformed *E. coli* for the delivery of the expression vector into salmon tissues, fish were immersed in various concentrations of DNA or *E. coli* and luciferase expression was measured in selected tissues four days after immersion (FIG. 3). Expression of luciferase was dose dependent; tissues from the muscle, gill and kidney expressed the highest levels of luciferase when immersed in the highest concentrations of transformed *E. coli* or naked DNA (FIG. 3). Significant differences in luciferase expression were observed in the gill (FIG. 3 *b*): 5 mg/l, 1 mg/l and 0.1 mg/l naked DNA induced significantly higher levels of expression than $10^3$ *E. coli* cells/l transformed with pCMVtkluc and the plus negative control ($p<0.05$). Additionally, fish immersed in $10^{10}$ cells/l expressed significantly higher levels of luciferase in the gill than fish immersed in pluc ($p<0.05$). In muscle tissue, increasing levels of luciferase expression were detected after immersion in increasing concentrations of naked DNA (FIG. 3 *a*); however, no expression was observed in the muscle when fish were immersed in transformed *E. coli* (not shown). No increase in expression was observed in the liver or spleen four days after immersion (not shown).

Optimization of the Length of Immersion Time

Figure 4A:
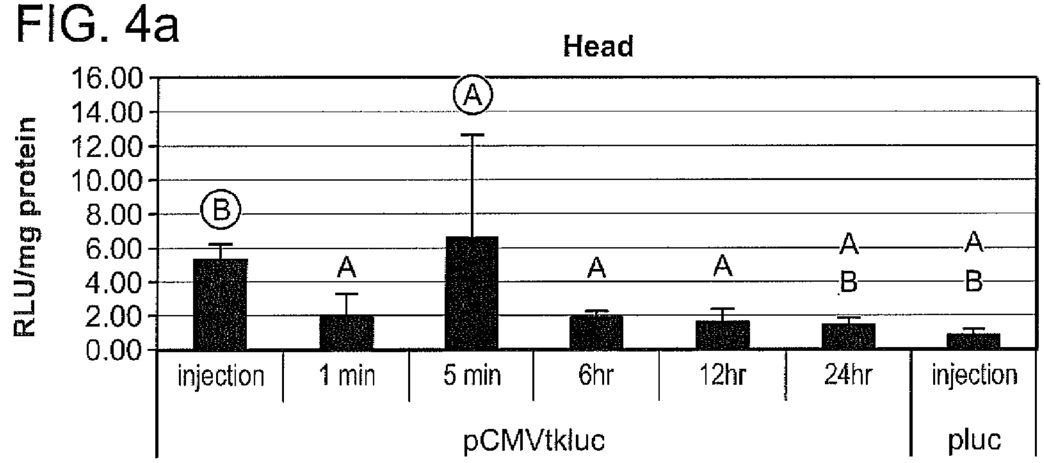
Figure 4B:
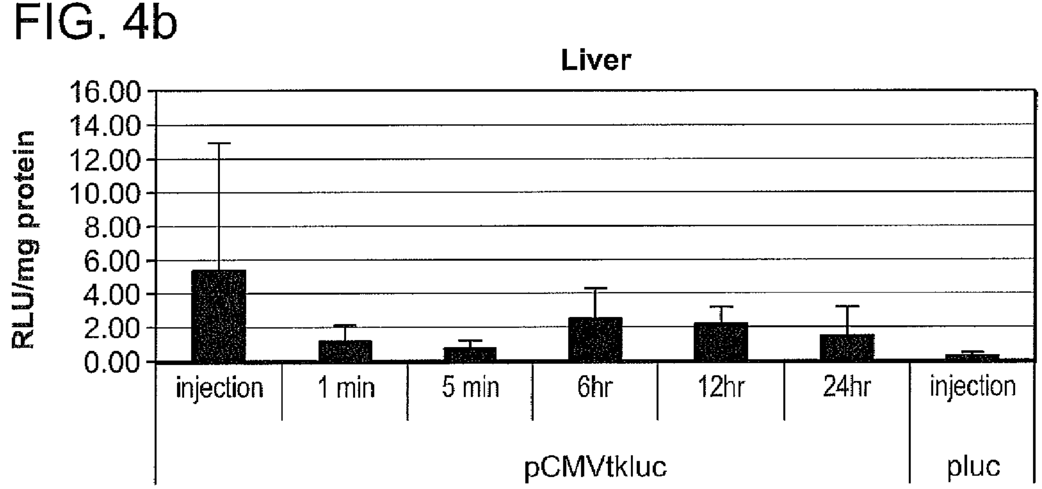
Figure 4C:
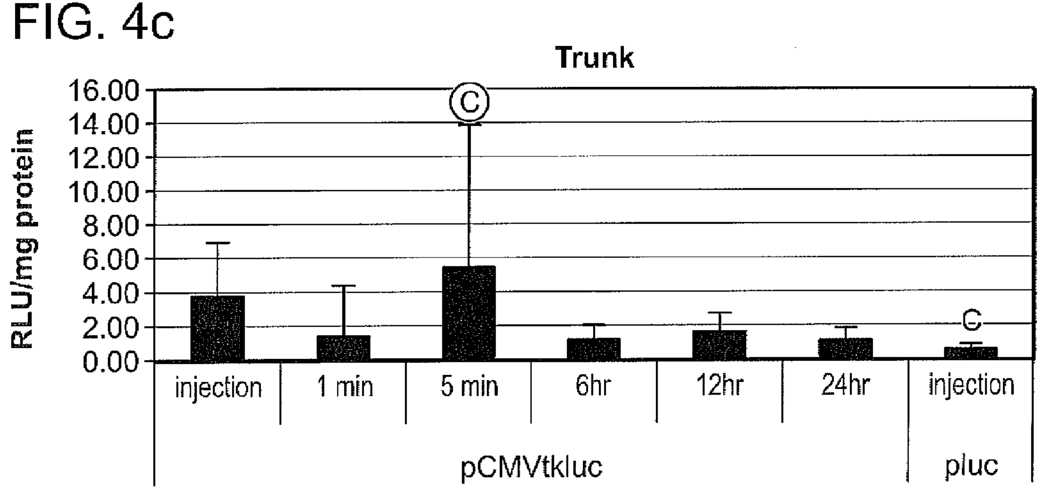

Referring to FIGS. 4 *a-c*, fish were immersed in $10^{10}$ cfu/l of formalin-killed *E. coli* transformed with pCMVtkluc for varying amounts of time. Negative and positive controls consisted of 25 μg pluc and pCMVtkluc injections (respectively). Luciferase expression was measured in (a) head (b) liver and (c) trunk, 4 days after immersion. Results are expressed as a ratio of firefly luciferase expression (RLU) to mg of protein±standard deviation. Immersion time (t=1 min) is the mean of two experiments; all other immersion lengths were tested once, n=10 per group. Statistical differences were found between circled and non-circled letter pairs ($p<0.05$).

A significant increase in luciferase expression was observed in the head and trunk of fish immersed for 5 minutes compared to the negative pluc control ($p<0.05$) (FIGS. 4 *a* and 4 *c*). Expression in the head of fish immersed for 5 minutes was also significantly higher than all other immersion times ($p<0.05$) (FIG. 4 *a*). Although luciferase expression was observed in the liver after immersions of longer duration, the expression levels were low and not statistically significant compared to the negative control (FIG. 4 *b*). Overall, these data indicate that increasing the duration of the immersion from 5 minutes to 6 hours does not increase levels of luciferase expression.

Construction of Expression Vectors for the DNA Vaccination of Fish

Evaluation of Promoter and Poly-A Sequences

Figure 5:
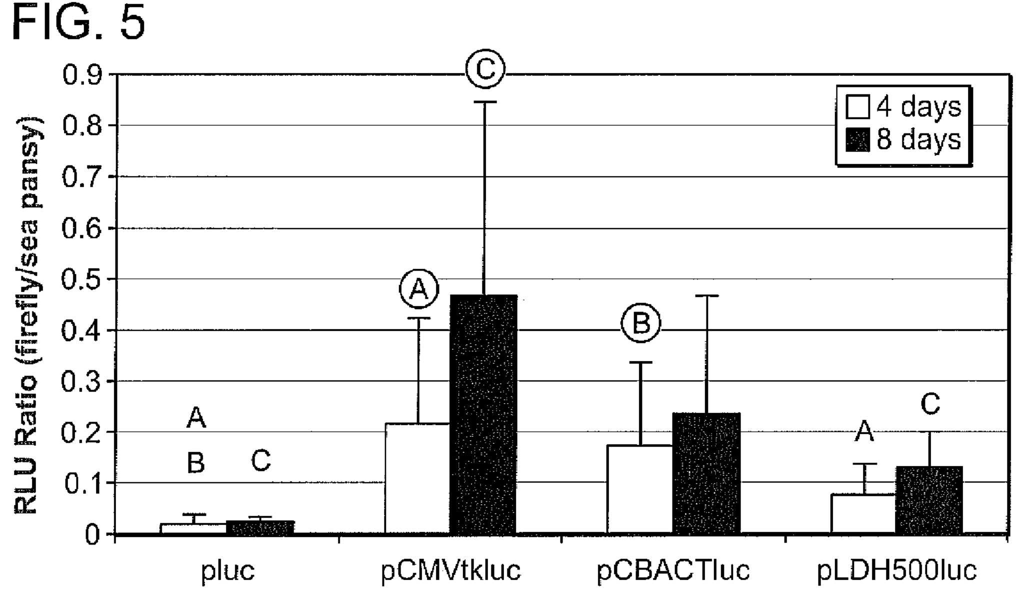
FIG. 5 is a graph showing the effect of promoter sequence on luciferase expression in transfected Atlantic salmon muscle tissue.

Referring to FIG. 5, luciferase expression was measured 4 (clear bars) and 8 days after co-injecting 25 μg of a test plasmid and 5 μg of pRL-CMV in the muscle tissue. Results are expressed as ratio of firefly luciferase expression to sea pansy (*Renilla*) luciferase expression±standard deviation of the mean of two experiments, n=6-10 per group. Statistical differences were found between the circled and non-circled letter pairs ($p<0.05$).

Promoters from the carp beta-actin gene (CBACT) and the killifish lactate dehydrogenase-B gene (LDH) were compared to the cytomegalovirus (CMV) enhancer/thymidine kinase (tk) promoter and evaluated for their ability to drive expression of the luciferase reporter gene in Atlantic salmon muscle tissue (FIG. 5). Both the CBACT (pCBACTluc) and CMVtk (pCMVtkluc) promoters induced significantly higher levels of luciferase expression when compared to the negative control pluc (day 4. $p<0.05$). The LDH promoter (pLDH500luc) drove the least amount of luciferase expression of the three promoters tested and was significantly less than that of the CMVtk promoter (pCMVtkluc) (days 4 & 8, $p<0.05$). An increasing trend in luciferase expression was observed from 4 days to 8 days in each of the tested promoters.

Figure 6:
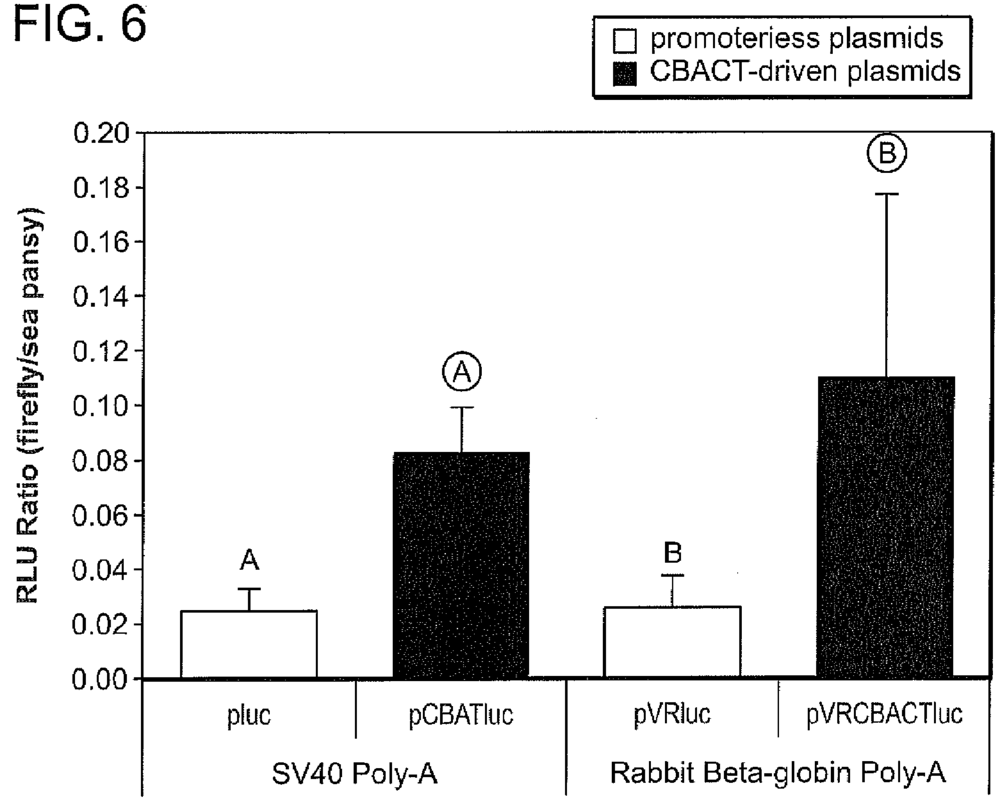
FIG. 6 is a graph showing the effect of polyadenylation signal on luciferase expression in transfected Atlantic salmon muscle tissue.

Referring to FIG. 6, luciferase expression was measured 4 days after co-injecting 25 μg of a test construct and 5 μg of pRL-CMV in the muscle tissue. Results are expressed as ratio of firefly luciferase expression to sea pansy (Renilla) luciferase expression±standard deviation of one experiment, n=6-10 per group. Statistical differences were found between circled and non-circled letter pairs ($p<0.05$).

A comparison of the Simian virus 40 (SV40) poly-A signal and the rabbit beta-globin (mRBG) poly-A signal was conducted to determine their efficiency in driving expression of the luciferase gene when coupled with the CBACT promoter (see Table 1 for plasmid components). Both test plasmids (pCBACTluc and pVRCBACTluc) drove efficient levels of expression demonstrated by the statistical differences between each plasmid and its respective negative control ($p<0.05$) (FIG. 6). Additionally, the lack of statistical difference between pCBACTluc (CBACT/SV40) and pVRCBACTluc (CBACT/mRBG) indicates that their luciferase expression levels were similar. However, an optimized luciferase gene was used in pVRCBACTluc while pCBACTluc contained a non-optimized luciferase gene.

Construction of Expression Vectors for the DNA Vaccination of Fish.

The main elements of a generic expression vector for the DNA vaccination of fish include a suitable fish promoter (carp β-actin), a polyadenylation signal of fish origin (wolffish AFP polyA), and a kanamycin resistance cassette (see table 2). The vector was constructed by first substituting the ampicillin resistance cassette in pGEM-7ZF (+) (Promega) for a kanamycin resistance cassette from the minitransposon TN5. The carp beta-actin promoter-luciferase gene cassette from pCBACTluc was subcloned into the modified pGEM-7Z (+) digested with SacI and HindIII (pJL1). The wolffish antifreeze protein polyA was amplified using the polymerase chain reaction and primers 5'-CGGCCGTCACAAACCCAACTCT-3' (SEQ ID NO: 3) and 5'-CGGCCGAGGGTGACAAAAATAAG-3' (SEQ ID NO: 4). The purified PCR fragment was blunt-end cloned into pJL1 digested linearized with BstXI. The ability of the resulting plasmid (pJL3) to drive the expression of the luciferase gene in the tissues of Atlantic salmon was tested by determination of luciferase expression in muscle homogeneates from fish sacrificed 4 days after intramuscular injection of 25 μg of plasmid. The plasmid pJL3 is able to drive the expression of the luciferase gene to levels similar to the expression vector pCMVtkluc (See Table 2).

TABLE 2

| Expression vector | Luciferase activity in muscle of Atlantic salmon (ratio of luciferase/renilla +/− SEM) |
|---|---|
| pCMVtk luc | 1.1 ± 0.6 |
| PCBACTluc | 0.5 ± 0.2 |
| pJL3 | 0.9 ± 0.4 |
| pJGJ1 | 1.1 ± 0.3 |
| pLUC (negative control) | 0.3 ± 0.2 |

Construction of Eukaryotic Expression Vectors for the DNA Vaccination of Fish Using Transformed Bacterial Fish Pathogens.

A eukaryotic expression vector that can be propagated and maintained in bacterial fish pathogens (pJGJ1) was constructed by subcloning the CMV promoter/luciferase gene/bGH polyA cassette from pcDNA3 (Invitrogen) into the broad host range plasmid pACYC184 by blunt end ligation. The ability of the resulting plasmid (pJGJ1) to drive the expression of the luciferase gene in the tissues of Atlantic salmon was tested by determination of luciferase expression in muscle homogeneates from fish sacrificed 4 days after intramuscular injection of 25 μg of test plasmid. The resulting plasmid (pJGJ1) is able to drive the expression of the luciferase gene in the muscle of Atlantic salmon to levels similar to the expression vector pCMVtkluc (See Table 2). The plasmid was used to successfully transform *Aeromonas salmonicida* cells.

Transformation of *Vibrio anguillarum* Using the DNA Coding for Eukaryotic Expression Vectors A non-pathogenic strain of *V anguillarum* using insertional mutagenesis has been developed and is disclosed in U.S. patent application Ser. No. 09/915,706 filed on Jul. 26, 2001, now abandoned, of which U.S. patent application Ser. No. 10/780,347, filed on Feb. 17, 2004, which issued as U.S. Pat. No. 6,913,757 on Jul. 5, 2005, is a continuation of entitled "A Live, Avirulent Strain of *V. anguillarum* that Protects Fish Against Infection by Virulent *V. anguillarum* and Method for Making the Same" invented by David R. Nelson, which disclosure is hereby incorporated by reference in its entirety into this disclosure. Preliminary experiments indicate that immunization of Atlantic salmon by intraperitoneal injection of the non-pathogenic strain (live vaccine) provides protection against challenge with the wild type strain. The wild type *V. anguillarum* and the non-pathogenic strain, which is characterized in that it is incapable of expressing a functional MugA protein, can be used as vectors for the delivery of DNA vaccines in fish (SEQ ID NO: 5).

Experimental Procedure

The plasmid pSUP202 (Simon, R., U. Priefer, and A. Pühler. 1983. Abroad host range mobilization system for in vivo genetic engineering: transposon mutagenesis in gram negative bacteria. Bio/Technology 1:784-791) can be used in the development of eukaryotic expression vectors to be introduced in *V. anguillarum* by conjugation or transformation. In conjugation (or bacterial mating), a plasmid containing a mobilization signal and transfer sequences (pSUP202) is introduced into *V. anguillarum* from *E. coli* by mating. That is, the two different cell types are mixed together and the plasmid (pSUP202) encodes factors that permit it to transfer itself from one bacterium to another. The recipient *V. anguillarum* strain now carrying the plasmid is selected by antibiotic resistance. The plasmid pSUP202 contains a wide host range origin of replication (allows for replication in bacterial cells other than *E. coli*) and elements that allow for the persistence of plasmid DNA in *V. anguillarum*. The generic fish expression vector that was developed as previously discussed is modified for the transformation of *V. anguillarum* by subcloning the eukaryotic promoter-gene of interest-polyA signal cassette into a modified shortened version of the plasmid pSUP202 in which unnecessary sequences have been removed. The DNA of the resulting plasmid (pNG1) is introduced into mutant and wild-type *V. anguillarum* by regular mating using standard protocols (Milton D L, Norqvist A, Wolf-Watz H. Cloning of a metalloprotease gene involved in the virulence mechanism of *Vibrio anguillarum*. J. Bacteriol. 1992; 174:7235-7244). The conditions for persistence and replication of expression vector DNA in *V. anguillarum* and the integrity of expression vectors are determined using standard protocols.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A method of inducing an immune response in a fish against one or more pathogens which comprises:

transforming a bacterium consisting of a live, attenuated strain of *V. anguillarum* which comprises a mugA gene comprising nucleotides 1218-2610 of SEQ ID NO: 5, the strain having a mutation located within nucleotides 1218-2610 of SEQ ID NO: 5 that renders the strain incapable of expressing a functional mugA protein, with a plasmid comprising DNA of interest encoding at least one protein antigen for each of the pathogens; and;

immersing the fish in a solution comprised of the, the method characterized in that the protein antigen is produced by the fish.

2. The method according to claim 1 wherein the fish is selected from the group of finfish.

3. The method according to claim 1 wherein the plasmid comprises a fish promoter, a polyadenylation signal of fish origin and a kanamycin resistance cassette.

4. The method according to claim 3 wherein the polyadenylation signal is wolfish AFP poly A.

* * * * *